United States Patent [19]

Yanagihara et al.

[11] Patent Number: 5,516,277
[45] Date of Patent: May 14, 1996

[54] PROCESS OF FUEL COMBUSTION

[75] Inventors: Hiromichi Yanagihara, Gotemba; Tomoji Ishiguro, Nagoya, both of Japan

[73] Assignee: Toyota Jidosha Kabushiki Kaisha, Toyota, Japan

[21] Appl. No.: 330,620

[22] Filed: Oct. 28, 1994

Related U.S. Application Data

[63] Continuation of Ser. No. 107,189, Aug. 13, 1993, abandoned.

[30] Foreign Application Priority Data

Aug. 24, 1992 [JP] Japan ................................ 4-224250

[51] Int. Cl.⁶ ........................................................ F23B 7/00
[52] U.S. Cl. ............................... 431/2; 110/341; 110/342; 110/345; 431/8
[58] Field of Search ................................. 110/342, 344, 110/345, 341; 431/2, 3, 8

[56] References Cited

U.S. PATENT DOCUMENTS 4,309,949  1/1982  Rastogi ................... 110/341
4,609,342  9/1986  Showalter ................ 431/2

FOREIGN PATENT DOCUMENTS 487255    11/1991  European Pat. Off. .
4041127   2/1992   Germany .
33920     1/1991   Japan .
93/01260  1/1993   WIPO .

OTHER PUBLICATIONS

AVL (German Machine Society Journal) No. 714 (no date).
Automobile Technology Journal, vol. 22, No. 1, Jan. 1991.

*Primary Examiner*—Denise L. Gromada
*Attorney, Agent, or Firm*—Kenyon & Kenyon

[57] ABSTRACT

A process for burning fuel includes the following steps: burning a fuel; putting an inner shell formed in a course of soot formation into contact with other components in a combustion gas to promote a chemical reaction of the other components in the combustion gas prior to the formation of an outer shell; and at the same time, inhibiting the formation of the outer shell around the inner shell. By this process, the discharged $NO_x$ gas is reduced and the amount of discharged soot is decreased.

6 Claims, 4 Drawing Sheets

PROCESS OF FUEL COMBUSTION

This application is a continuation of application Ser. No. 08/107,189 filed Aug. 13, 1993, now abandoned.

BACKGROUND OF THE INVENTION

1. Field of the Invention

The present invention relates to a process of fuel combustion. More particularly, the present invention relates to a process for burning fuel with reduced soot and/or $NO_x$ discharge.

2. Description of the Related Art

Soot is generated when there is not enough oxygen around the fuel molecules or fuel particles on burning. Such soot is discharged into the air causing air pollution. Therefore, great efforts have been made in order to inhibit the generation of soot. For example, in the art of internal combustion engines which burn fuel in a combustion chamber, initial combustion is done in a condition such that the fuel-air ratio is rich and later combustion is done in a condition such that fuel-air ratio is lean in order to limit the generation of soot during later combustion as disclosed in Japanese Unexamined Patent Publication No. 3-3920.

However, if the fuel-air mixture is burned in a condition such that fuel-air mixture is rich, soot is always generated, thus soot is generated during initial combustion in the above internal combustion engine. It is difficult to inhibit the generation of soot on burning fuel in internal combustion engines and in other fields. This is due to the fact that the mechanism of soot generation is not resolved. If the mechanism of soot generation is resolved, the generation of soot can be inhibited.

SUMMARY OF THE INVENTION

It is an object of the present invention to provide a process for burning fuel without generating soot by resolving the mechanism of soot generation.

Other objects and advantages of the present invention will become apparent from the detailed description following, in conjunction with the appended claims.

DETAILED DESCRIPTION OF THE PREFERRED EMBODIMENT

In accordance with the present invention, a novel process for burning fuel is provided which avoids the above-noted problems and which provides a process for burning fuel with reduced soot and $NO_x$. The process of this invention comprises the following steps: burning a fuel; putting an inner shell formed in a course of soot formation into contact with other components in a combustion gas to promote a chemical reaction with said other components in the combustion gas prior to the formation of an outer shell; and at the same time, inhibiting the formation of the outer shell around said inner shell.

By bringing the inner shell into contact with other components in the combustion gas, a chemical reaction with said other components in the gas is promoted due to the high activity of said inner shell. At that time, the formation of the outer shell around the inner shell is inhibited, thus inhibiting soot formation.

Referring to FIGS. 1 to 7, the mechanism of soot formation resolved by the inventors of this application is described. FIGS. 1 to 7 show the mechanism of soot formation in a diesel engine, but it has been confirmed that any fuel utilized in combustion forms soot by a similar mechanism.

Figure 1:
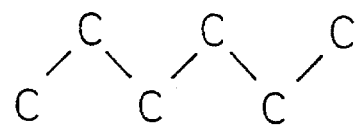
FIGS. 1 to 7 are views showing the course of soot formation.

FIG. 1 shows an example of a fuel molecule contained in light oil. This fuel molecule has a molecular weight of about 200 and a configuration wherein carbon atoms are bound linearly.

Figure 2:
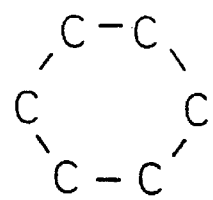
Figure 2:
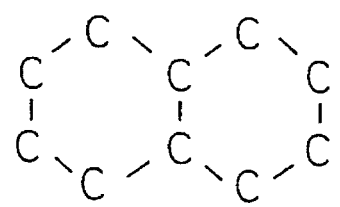
Figure 3:
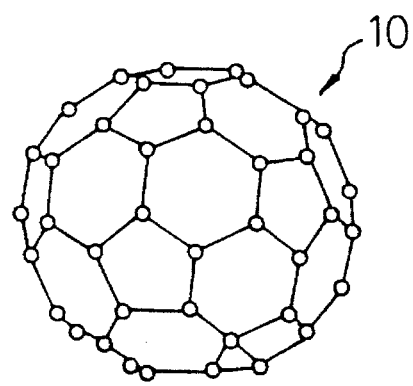

At the beginning of the combustion of fuel, fuel molecules take the shape of cyclic structure of $C_6$ to $C_{10}$ as shown in FIG. 2, then it becomes the spherical cluster 10 of $C_{60}$ or $C_{72}$ as shown in FIG. 3. This cluster 10 consists of a combination of 6-member ring structures and 5-member ring structures.

Figure 4:
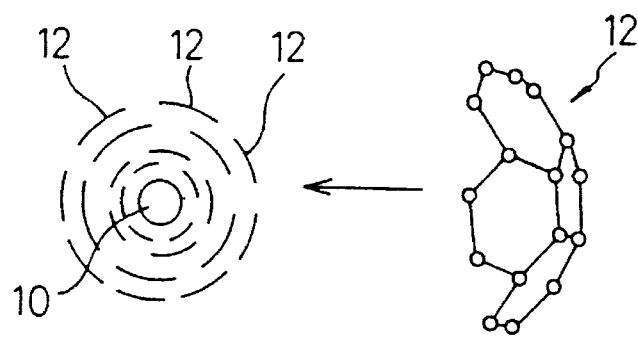

During combustion, as shown in FIG. 4, partial spherical structures 12 consisting of a combination of 6-member ring structures and 5-member ring structures, stack successively around said cluster 10. A particle formed in such a way continues to grow and it becomes a particle having a particle size of about 3 nm at the end of this step.

Figure 5:
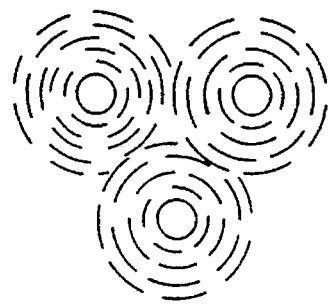

Next, a few of these particles agglomerate to form an aggregate of particles as shown in FIG. 5. This aggregate is referred to as an inner shell. Each particle which composes this inner shell has high activity because it is surrounded by a structure 12 consisting of unstable 5-member ring structures. Therefore, the inner shell has high activity.

Figure 6:
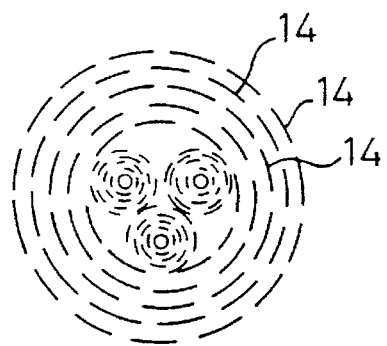

As combustion proceeds, stable graphites form, and these graphites 14 stack successively around the inner shell as shown in FIG. 6. In such a way, a particle consisting of an inner shell and graphites 14 around said inner shell continues to grow and it becomes a particle having a particle size of about 30 nm at the end of this step. As described above, a particle in this step consists of an inner shell and a layer of graphites 14 around said inner shell, and this layer of graphites is referred to as an outer shell. These graphites are stable and have little activity. Therefore, this outer shell has no activity.

Figure 7:
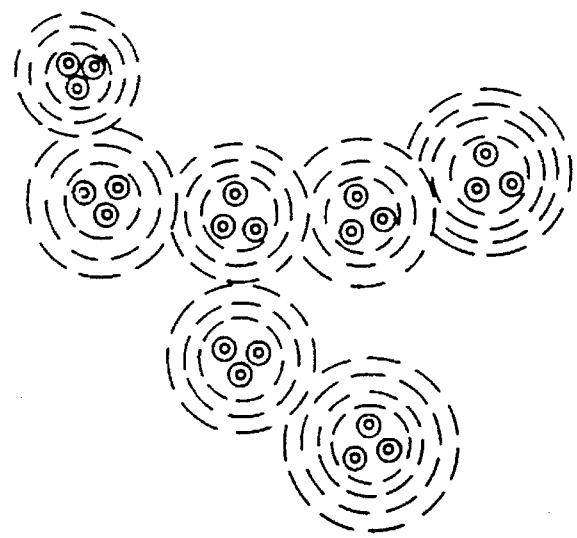

Next, particles as shown in FIG. 6 bind linearly as shown in FIG. 7. Groups of particles as shown in FIG. 7 form the material called soot.

As described above, in soot which forms during combustion of the light oil utilized in diesel engines, an outer shell is formed around inner shell. However, in soot which forms on combustion of gasoline utilized in gasoline engines, the boundary between the inner shell and the outer shell is somewhat unclear. That is, gasoline burns in a similar way to that shown in FIG. 1 to FIG. 4. However, particles as shown in FIG. 4 do not agglomerate as shown in FIG. 5. After the particle as shown in FIG. 4 continue to grow, graphites 14 stack to form the outer shell. This is a type of soot growing when a pre-mixture is burned. Therefore, this soot grows in a similar ways when kerosene or heavy oil is burned in a boiler.

Although the boundary between the inner shell and the outer shell is somewhat unclear, it is obvious that the outer shell is formed around the inner shell. Therefore, when soot forms during fuel combustion, said soot certainly consists of an inner shell and an outer shell. Thus, in a course of soot formation, any fuel forms an inner shell having high activity at first, and then an inactive outer shell forms around said inner shell.

As described above, the outer shell is inactive. Therefore, once the outer shell forms, soot cannot burn even if there is enough oxygen around the soot and the soot remains as it is. In the prior art, it was believed that soot had poor reactivity and could not cause chemical reactions because soot has reached an inactive state.

However, the present inventors have found that there is a stage in which soot has high activity in the course of soot formation. That is, an inner shell having high activity forms in the course of soot formation. Thus, by using such an inner shell having high activity, various chemical reactions can be caused. For example, if there is enough oxygen when the inner shell forms, the inner shell can be oxidized immediately, and soot does not form. Namely, to inhibit soot formation, there is no point in providing enough oxygen around the outer shell after the outer shell forms. Enough oxygen must be present around the inner shell when said inner shell forms.

If a material which can be reduced when the inner shell forms, such as an oxide, is present around the inner shell, the inner shell can remove the oxygen from such an oxide and such an oxide is reduced. Also in this case, there is no point in providing enough oxide around the outer shell after the outer shell forms. Enough oxide must be present around the inner shell when said inner shell forms.

If soot consisting of an inner shell having high activity is put into contact with other components in a combustion gas before the inactive outer shell forms around the inner shell, a chemical reaction of the other components in combustion gas is promoted by the soot consisting of an inner shell. This is the principle of the process for burning fuel utilizing the high activity of the inner shell according to the present invention.

Thus, in accordance with the present invention, if specific components other than soot are present or produced in a place for burning fuel which can form soot in the course of combustion or a place for the discharge of combustion gas thereof, promotion of a reduction reaction or other various chemical reactions of the specific components to make it harmless or use it efficiently is attained by putting the specific components into contact with the inner shell having high activity based on the finding by the inventors of this invention.

Examples of "fuels which can form soot in the course of combustion" typically include various petroleum fuels such as gasoline, light oil, heavy oil and the like, but it is not limited to the petroleum fuel. Also included gaseous fuels such as natural gas and solid fuel such as coal. An example of "a place of combustion of fuel and a place of discharge of combustion gas", which is not limited, includes a gasoline engine, a diesel engine, a boiler, various combustion heaters and the exhaust systems thereof such as exhaust pipes and exhaust ducts. Examples of "specific components other than soot in combustion gas" include nitrogen oxide ($NO_x$) which causes air pollution. It is desired to reduce this $NO_x$ into nitrogen gas ($N_2$) by a reduction reaction. The specific components also include various known or unknown materials present or produced in combustion gas which can cause a desired chemical reaction by a reaction with the inner shell.

If there is a second component (other than components intended to promote the chemical reaction) which has a reactivity with an inner shell in combustion gas, there is a possibility that the inner shell will react with such a second component preferentially. In such a case, it is preferable to put the inner shell into contact with a component intended to promote its chemical reaction after allowing the second component to decrease naturally or with an adequate means. An example of such a case is a circumstance in which there is oxygen as a second component when one intends to reduce $NO_x$, produced in a diesel engine, by allowing the $No_x$ to contact the inner shell.

Allowing a component intended to promote its chemical reaction to contact the inner shell will inhibit the growth of the inner shell into soot. This inner shell is easily oxidized and destructed when it is put into contact with oxygen. Therefore, the amount of discharged soot can be reduced in accordance with the present invention.

To illustrate the effect of the present invention, the following example is given. In this example, NO purification in relation to temperature is measured by putting a model gas containing a specified concentration of NO into contact with the inner shell formed separately.

Figure 8:
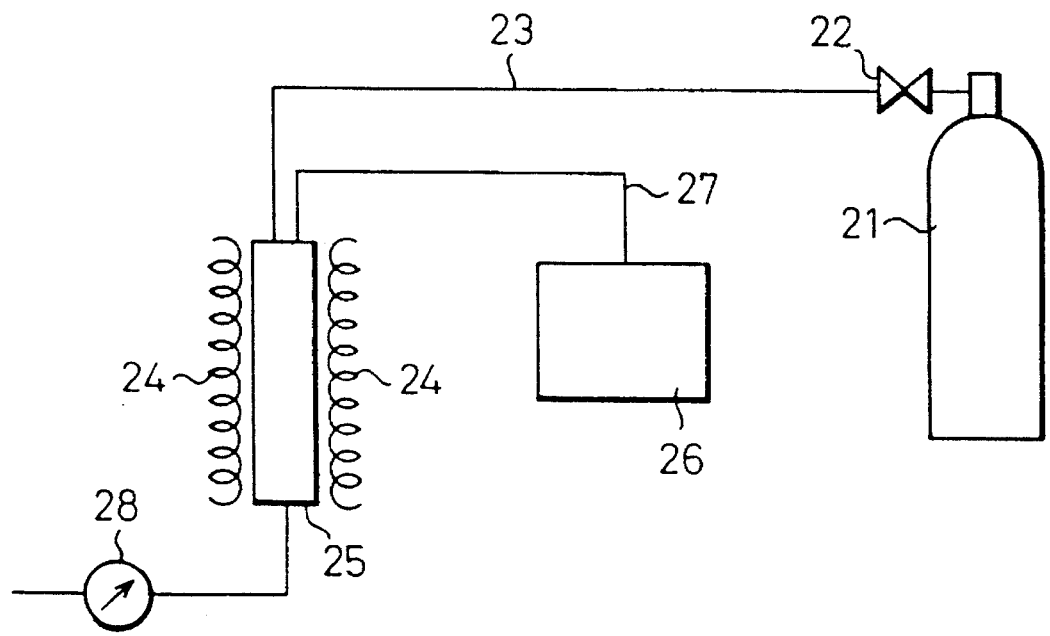
FIG. 8 is a schematic view of an apparatus used in an example of the present invention.

FIG. 8 is a schematic view of an apparatus utilized in this example. In FIG. 8, a model gas containing NO in the gas cylinder 21 is allowed into the path 23 through the valve 22. Then the model gas is introduced into the reaction tube 25 which is provided with the heater 24. A differential exhauster 26, which produces an inner shell of about 3 nm in diameter by arc-discharging to graphite, is connected to one end of the reaction tube 25 through the path 27. The gas emitted from the other end of the reaction tube 25 is passed to an $NO_x$ meter 28, by which NO concentration in the model gas, and, in turn, the NO purification, is measured.

Figure 9:
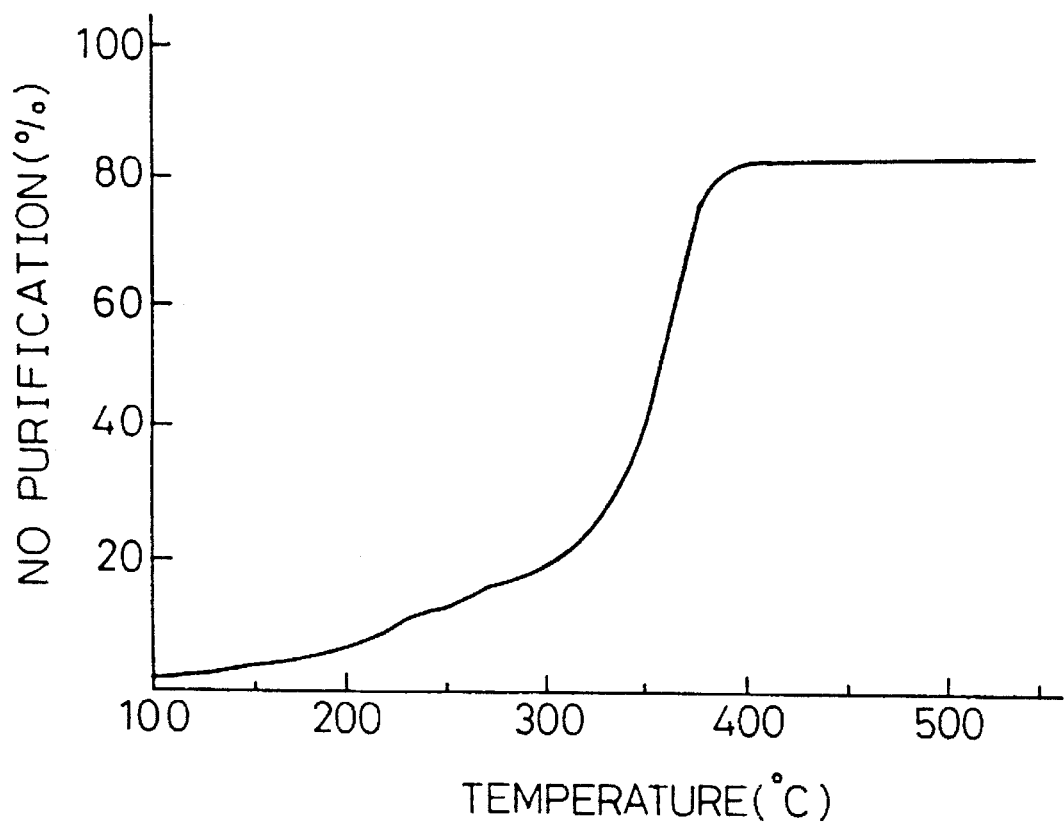
FIG. 9 is a graph showing NO purification attained by an apparatus of FIG. 8.

FIG. 9 illustrates a result of measurement of NO purification of the model gas in which the model gas and the inner shell are put into contact in the heated reaction tube 25 while the temperature inside the reaction tube 25 is gradually increased. In FIG. 9, the abscissa indicates the temperature inside the reaction tube 25 and the ordinate indicates NO purification (%). From FIG. 9, it is shown that NO is purified especially at above 355° C. efficiently.

What is claimed is:

1. A process for burning fuel comprising the steps of burning a fuel; putting an inner shell formed in a course of soot formation into contact with other components in a combustion gas to promote a chemical reaction of said other components in the combustion gas prior to the formation of an outer shell; and at the same time, inhibiting the formation of the outer shell around said inner shell.

2. The process according to claim 1, wherein the other component is $NO_x$ gas.

3. The process of claim 1, wherein discharged $NO_x$ gas is reduced.

4. The process of claim 1, wherein an amount of discharged soot is decreased.

5. The process of claim 1, wherein the fuel is selected from the group consisting of liquid petroleum fuel, gas fuel and solid fuel.

6. The process of claim 1 utilized in a gasoline engine, a diesel engine, a boiler, various combustion heaters, or exhaust systems thereof.

* * * * *

UNITED STATES PATENT AND TRADEMARK OFFICE
CERTIFICATE OF CORRECTION

PATENT NO. : 5,516,277
DATED : May 14, 1996
INVENTOR(S) : Hiromichi YANAGIHARA, et al.

It is certified that error appears in the above-indentified patent and that said Letters Patent is hereby corrected as shown below:

Column 2, line 60, change "ways" to --way--.

Column 3, line 50, after "included" insert --are--.

Signed and Sealed this

First Day of October, 1996

BRUCE LEHMAN

*Attest:*

*Attesting Officer*   Commissioner of Patents and Trademarks

UNITED STATES PATENT AND TRADEMARK OFFICE
CERTIFICATE OF CORRECTION

PATENT NO.    : 5,516,277
DATED         : May 14, 1996
INVENTOR(S)   : Hiromichi Yanagihara, et al It is certified that error appears in the above-indentified patent and that said Letters Patent is hereby corrected as shown below:

On title page, item [73], add second assignee: --Kabushiki Kaisha Toyota Chuo Kenkyusho, Aichi, Japan--

Signed and Sealed this

Eighteenth Day of February, 1997

Attest:

BRUCE LEHMAN

*Attesting Officer*   *Commissioner of Patents and Trademarks*